US007869018B2

(12) United States Patent
Strege et al.

(10) Patent No.: US 7,869,018 B2
(45) Date of Patent: Jan. 11, 2011

(54) METHOD AND APPARATUS FOR EVALUATING VEHICLE REFERENCE PLANES

(75) Inventors: Timothy A. Strege, Sunset Hills, MO (US); Patrick Callanan, St. Louis, MO (US); David A. Voeller, St. Louis, MO (US); Mark S. Shylanski, University City, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 12/716,459

(22) Filed: Mar. 3, 2010

(65) Prior Publication Data

US 2010/0166255 A1 Jul. 1, 2010

Related U.S. Application Data

(62) Division of application No. 11/013,057, filed on Dec. 15, 2004, now Pat. No. 7,702,126.

(51) Int. Cl.
*G01B 11/275* (2006.01)

(52) U.S. Cl. .................................................. 356/139.09

(58) Field of Classification Search ............ 356/139.09, 356/155; 187/203

See application file for complete search history.

(56) References Cited

U.S. PATENT DOCUMENTS

| | | | | |
|---|---|---|---|---|
| 5,600,435 | A * | 2/1997 | Bartko et al. | 356/139.09 |
| 5,724,128 | A * | 3/1998 | January | 356/139.09 |
| 6,545,750 | B2 * | 4/2003 | Roth et al. | 356/139.09 |
| 7,369,222 | B2 * | 5/2008 | Jackson et al. | 356/139.09 |
| 7,382,913 | B2 * | 6/2008 | Dorrance et al. | 382/151 |

* cited by examiner

*Primary Examiner*—Isam Alsomiri
(74) *Attorney, Agent, or Firm*—Polster, Lieder, Woodruff & Lucchesi, L.C.

(57) ABSTRACT

A method and apparatus for comparing reference planes during a vehicle wheel alignment procedure using a machine vision vehicle wheel alignment system. The machine vision vehicle wheel alignment system is configured to acquire position and orientation data associated with at least one optical target disposed in a field of view, to establish a first reference plane associated with a surface on which a vehicle undergoing an alignment procedure is disposed. Positional information associated with each wheel of the vehicle is then acquired by the machine vision vehicle wheel alignment system, and utilized to establish a second reference plane associated with each wheel of the vehicle. Differences between an orientation of the first reference plane and an orientation of the second reference plane are determined and identified to an operator or utilized to characterize components of the vehicle or vehicle support surface.

18 Claims, 8 Drawing Sheets

METHOD AND APPARATUS FOR EVALUATING VEHICLE REFERENCE PLANES

CROSS-REFERENCE TO RELATED APPLICATIONS

The present application is a divisional of, and claims priority from, U.S. patent application Ser. No. 11/013,057 filed on Dec. 15, 2004, and which is herein incorporated by reference.

STATEMENT REGARDING FEDERALLY SPONSORED RESEARCH

Not Applicable.

BACKGROUND OF THE INVENTION

The present invention relates generally to automotive vehicle lift systems having a pair of runways for supporting an automotive vehicle during a vehicle inspection or service procedure, and in particular, to a method and apparatus for utilizing a machine vision vehicle wheel alignment system to measure a level condition of the vehicle lift system runways and to provide measurements associated with the runway elevation positions.

During a vehicle wheel alignment service procedure, it is common for a vehicle undergoing the service procedure to be positioned on an automotive vehicle lift system to enable a technician to raise and lower the vehicle, as is required to access various components on the underside of the vehicle. A wide variety of automotive vehicle lift systems are known. One type of automotive vehicle lift system provides a pair of vertically adjustable runways on which the vehicle wheels are disposed. The runways may be either independent of each other, or coupled together with a connecting structure. Examples of vehicle lift systems employing two vertically adjustable runways include the model RX scissor lift rack, the model L421 Four-Post lift rack, and the RM parallelogram lift rack, each manufactured and sold by Hunter Engineering Co. of Bridgeton, Mo.

Typically, each runway in an automotive vehicle lift system is provided with one or more actuating mechanisms, such as a hydraulic cylinder or screw drive, which is controlled from a common location to regulate the vertical elevation of the individual runways. For safety reasons, the control system which regulates the actuating mechanisms is generally configured to maintain each runway in substantially the same horizontal plane during changes in elevation. An exemplary lift control system is shown in U.S. Pat. No. 6,189,432 to Colarelli et al. Additionally, a mechanism is commonly provided to "lock" the runways at one or more predetermined heights during elevation or when the runways are stationary, preventing collapse of the automotive vehicle lift system in the event of a failure in one or more of the actuating mechanisms.

When in use, runways of automotive vehicle lift systems may flex, twist, warp, or vary in elevation due to a number of factors. These factors may include the structural design of the runways and associated support structures, forces applied to the runways during elevation or lowering by the actuating mechanisms, or the weight distribution of a vehicle positioned on the runways. For example, the lateral position of a vehicle wheel on a runway can induce a flex in the runway surface by exerting a moment arm of force between the wheel contact point and the attachment point of the associated support structure for that runway.

For some vehicle service procedures, such as vehicle wheel alignment, the "levelness" of the runways on which the vehicle is disposed can influence measurements of the vehicle wheel alignment and suspension geometry. In particular, vehicle wheel camber and caster measurements may be effected by an un-level condition of a runway on which the vehicle wheel rests.

Accordingly, it would be advantageous to provide a method and apparatus which operates in conjunction with a vehicle wheel alignment system to obtain a measure of the "levelness" of the runways of an automotive vehicle lift system, and which utilizes such obtained measurements during the course of a vehicle wheel alignment procedure, or provides such obtained measurements to an operator to enable correction of a runway condition.

It would be further advantageous to provide a wheel alignment method for utilizing measurements of the automotive vehicle lift system to facilitate one or more measurements of a vehicle or vehicle wheel alignment angles.

BRIEF SUMMARY OF THE INVENTION

Briefly stated, a preferred method of the present invention enables a vehicle wheel alignment system to measure a level condition of an individual runway in an automotive vehicle lift system. The method includes the initial step of establishing a reference plane for a pair of runways of the vehicle lift. A measuring means is then disposed in at least one predetermined relationship to an upper surface of a runway of the vehicle lift, and at least one measurement is acquired by the vehicle wheel alignment system, from which a determination of a position and orientation of the measurement means is made. The determined position and orientation, the established reference plane, and the predetermined relationship are utilized to identify an orientation of the upper surface of the runway relative to the established reference plane.

An alternate method of the present invention enables a machine vision vehicle wheel alignment system to measure a level condition of an individual runway in an automotive vehicle lift system. The method includes the initial step of establishing a reference plane for a pair of runways of the vehicle lift. An optical target is disposed in at least one predetermined relationship to an upper surface of a runway of the vehicle lift. At least one image of the optical target is acquired by the machine vision vehicle wheel alignment system, from which a determination of a position and orientation of the optical target is made. The determined position and orientation, the established reference plane, and the predetermined relationship are utilized to identify an orientation of the upper surface of the runway relative to the established reference plane.

An alternate method of the present invention enables a machine vision vehicle wheel alignment system to compensate a wheel alignment angle measurement for surface orientations of at least one runway of an automotive vehicle lift system having a pair of runways on which a vehicle undergoing a wheel alignment angle measurement is supported. The method comprises the initial steps of establishing a reference plane and determining a first orientation of an upper surface of at least one of the runways relative to the established reference plane. A vehicle undergoing an alignment angle measurement is positioned on the automotive vehicle lift system, with at least one wheel of the vehicle on the runway upper surface. A second orientation of the upper surface of the runway is determined in proximity to the vehicle wheel, relative to the established reference plane. The first and second orientations are utilized to identify a change in the orientation of the upper surface of the runway relative to the established reference plane, due to the effect of the vehicle disposed on the runway. Subsequently, an alignment angle measurement associated with the wheel of the vehicle is compensated for a determinable effect of the identified change.

In a second alternate method of the present invention, a set of optical targets are removably disposed about the runways of an automotive vehicle lift system, and associated measurements of the position and orientation of each optical target are acquired by a machine vision wheel alignment system. Using the associated measurements, a reference plane defined by the position and orientation of the runways of the automotive vehicle lift system is determined. During a subsequent vehicle wheel alignment procedure, a set of optical targets are operatively coupled to the vehicle wheels, and measurements of the position and orientation of each optical target are acquired by the machine vision wheel alignment system. Utilizing the reference plane and the measured position and orientation of the wheel-mounted optical targets, axle height measurements are determined for each vehicle wheel.

In a third alternate method of the present invention, a set of optical targets are removably disposed about the runways of an automotive vehicle lift system, and associated measurements of the position and orientation of each optical target are acquired by a machine vision wheel alignment system. Using the associated measurements, an initial reference plane defined by the position and orientation of the runways of the automotive vehicle lift system is determined. During a subsequent vehicle wheel alignment procedure, a set of optical targets are operatively coupled to the vehicle wheels, and measurements of the position and orientation of each optical target are acquired by the machine vision wheel alignment system, and utilized to determine a current reference plane. A comparison of the current reference plane with the initial reference plane to identify orientation differences is utilized to identify a possible problem associated with the vehicle lift system or vehicle, and to provide a suitable warning to an operator.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
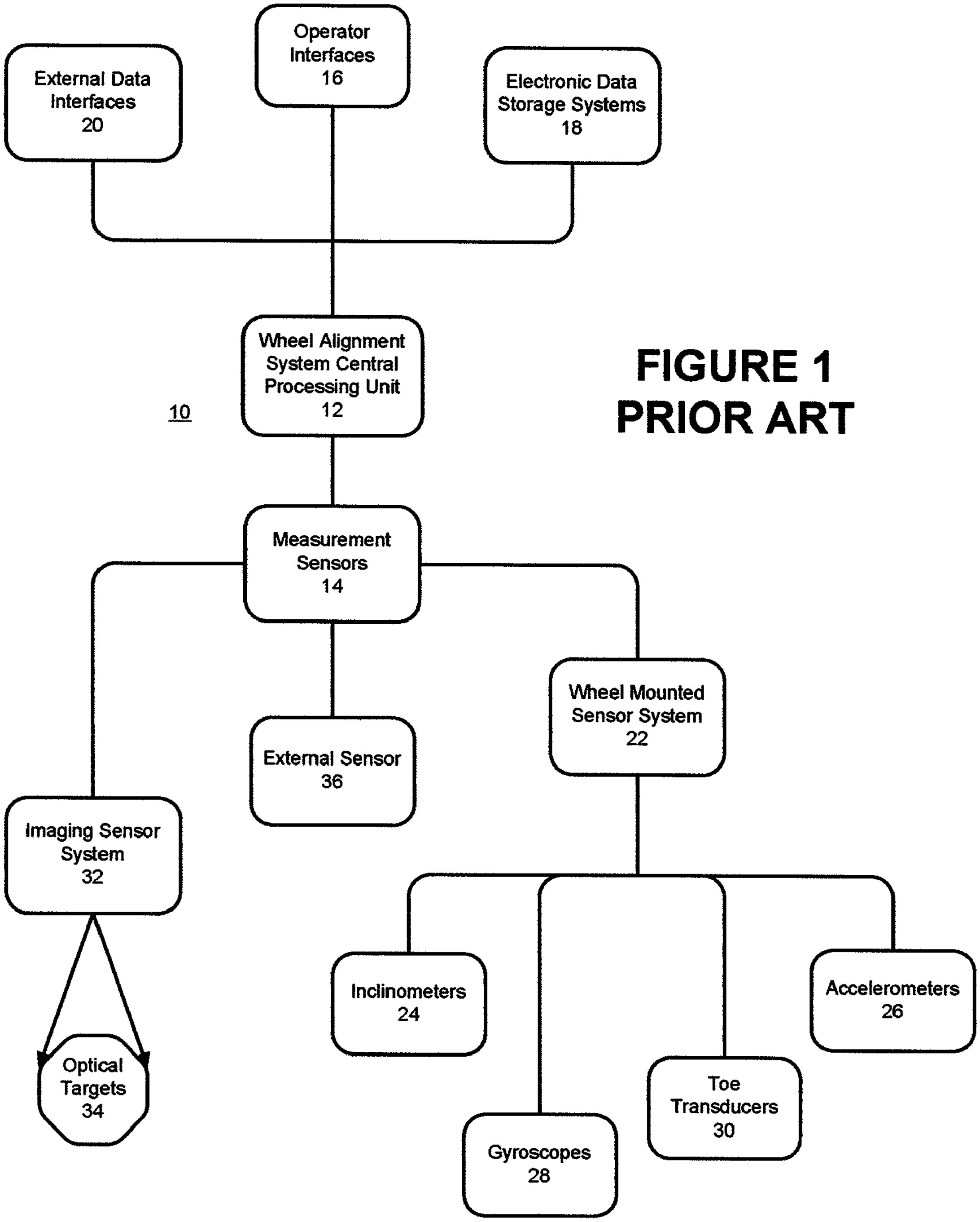
FIGURE 1 PRIOR ART
FIG. 1 is a simplified block diagram of the various components of a prior art vehicle wheel alignment system.

The methods and apparatus of the present invention as described herein are generally adapted for use with a computer-controlled vehicle wheel alignment system 10, such as shown in FIG. 1. A vehicle wheel alignment system 10 typically consists of a central processing unit 12 configured to carry out software instructions for the computation and measurement of vehicle wheel alignment angles. The central processing unit 12 may be a single or multi-processor computer, a micro-controller, or other suitable logic circuit, configured to receive data from, and/or communicate with, one or more devices such as measurement sensors 14, an operator interface 16, a data storage system 18, or external data interfaces 20 such as a computer network. Depending upon the particular configuration of the vehicle wheel alignment system 10, the measurement sensors 14 may include sensors configured for mounting to the wheels of a vehicle 22, such as inclinometers 24, accelerometers 26, gyroscopes 28, and toe-angle transducers 30. Alternatively, the measurement sensors 14 may consist of an imaging system 32, such as a camera or other imaging device, configured to acquire images of optical targets 34 or identifiable features disposed within an associated field of view. Additional external sensors 36, such as ride height sensors or tire pressure sensors may optionally be coupled to the vehicle wheel alignment system 10. Those of ordinary skill in the art will recognize that the various methods and embodiments of the present invention described herein may be adapted to a wide variety of known vehicle wheel alignment systems 10 having suitable measurement means and capacity to carry out the described operations.

It is preferred that the present invention be embodied in a vehicle wheel alignment system 10 configured with a machine-vision imaging sensor system 32 such as shown in U.S. Pat. No. 5,675,515 to January. The vehicle wheel alignment system 10 preferably includes at least one image sensor, such as a solid-state camera, configured to acquire an image of at least one optical target 34 disposed within a field of view of the image sensor. The optical target 34 may be a predetermined optical target, or may be identifiable features, such as a part of the vehicle, vehicle wheel, or vehicle lift mechanism. The acquired image is processed, either by the central processing unit 12 of the wheel alignment system 10, or a separate image processing unit associated with the imaging system 32, to identify a position and orientation of the optical target 34 in three-dimensional space. As is well understood in the art, geometric relationships between multiple optical targets 34 and image sensors can be determined from acquired images, and utilized in the calculation of various vehicle parameters, such as camber, caster, and toe wheel alignment angles.

Figure 2:
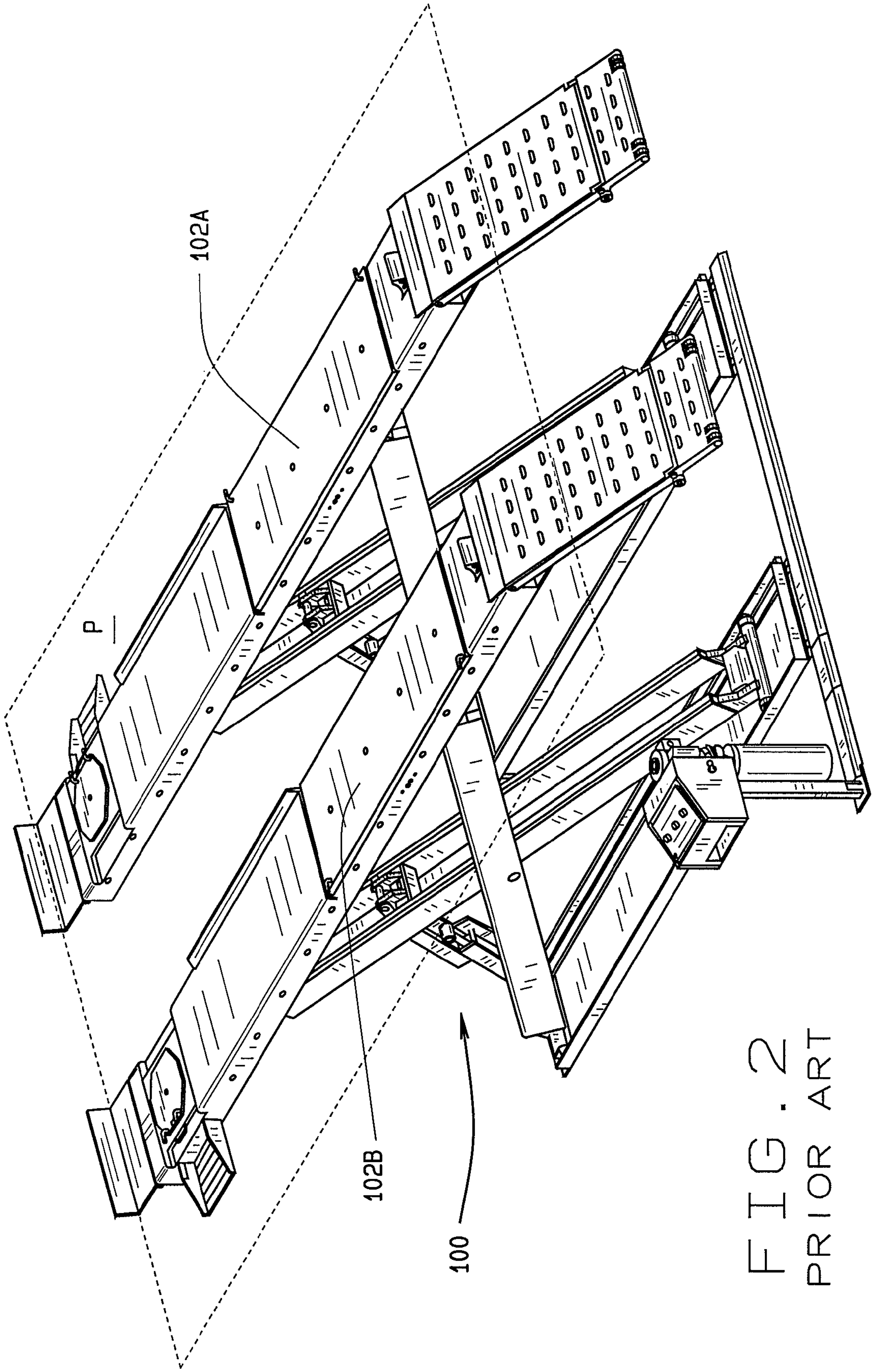
FIG. 2 PRIOR ART
FIG. 2 is a perspective view of a prior art scissor-type vehicle lift system including a pair of runways which define a reference plane.

A preferred method of the present invention enables a vehicle wheel alignment system 10 configured with machine-vision imaging sensors to acquire measurements associated with an automotive vehicle lift system 100, such as shown in FIG. 2, which are representative of a level condition for individual runways 102 in a pair of runways 102A, 102B on which the left-side and right-side wheels of a vehicle 12 are disposed during a vehicle service procedure.

Figure 3:
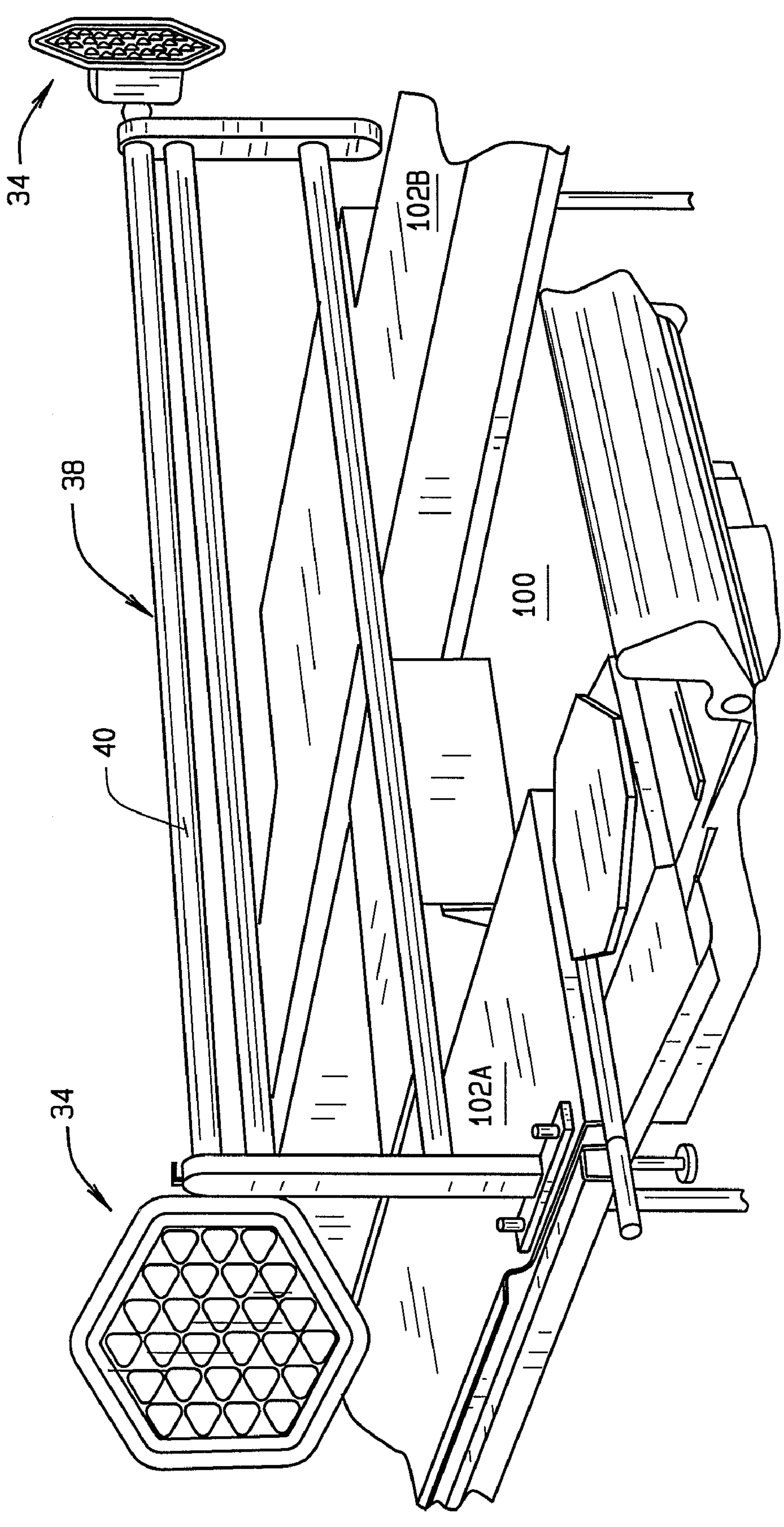
FIG. 3 PRIOR ART
FIG. 3 is a perspective view of a prior art optical target calibration fixture disposed on the runways of a vehicle lift system.

An initial step of establishing a calibration-level reference plane P for a pair of runways of the vehicle lift system 100 is carried out in a conventional manner utilizing the vehicle wheel alignment system 10 and a conventional calibration fixture 38 adapted for use with optical targets. A typical optical target calibration fixture 38, shown in FIG. 3 consists of a rigid support structure 40 having known dimensions, for supporting two or more optical targets 34 at opposite ends. The calibration fixture 38 is placed across the pair of runways 102A, 102B in a sequence of predetermined positions, and images of the optical targets 34, adjacent each side of the runways 102A, 102B are acquired. From the acquired images, the vehicle wheel alignment system 10 is configured to determine the calibration-level reference plane P in three-dimensional space which is representative of a planar surface substantially defined by the upper surfaces of the pair of runways 102A, 102B, as shown in FIG. 2. Those of ordinary skill in the art will recognize that the calibration-level reference plane P may be determined from either the observed positions and orientations of the optical targets 34, from calculated points based on the observed positions and orientations of the optical targets 34, or from a combination of observed and calculated points.

Figure 4:
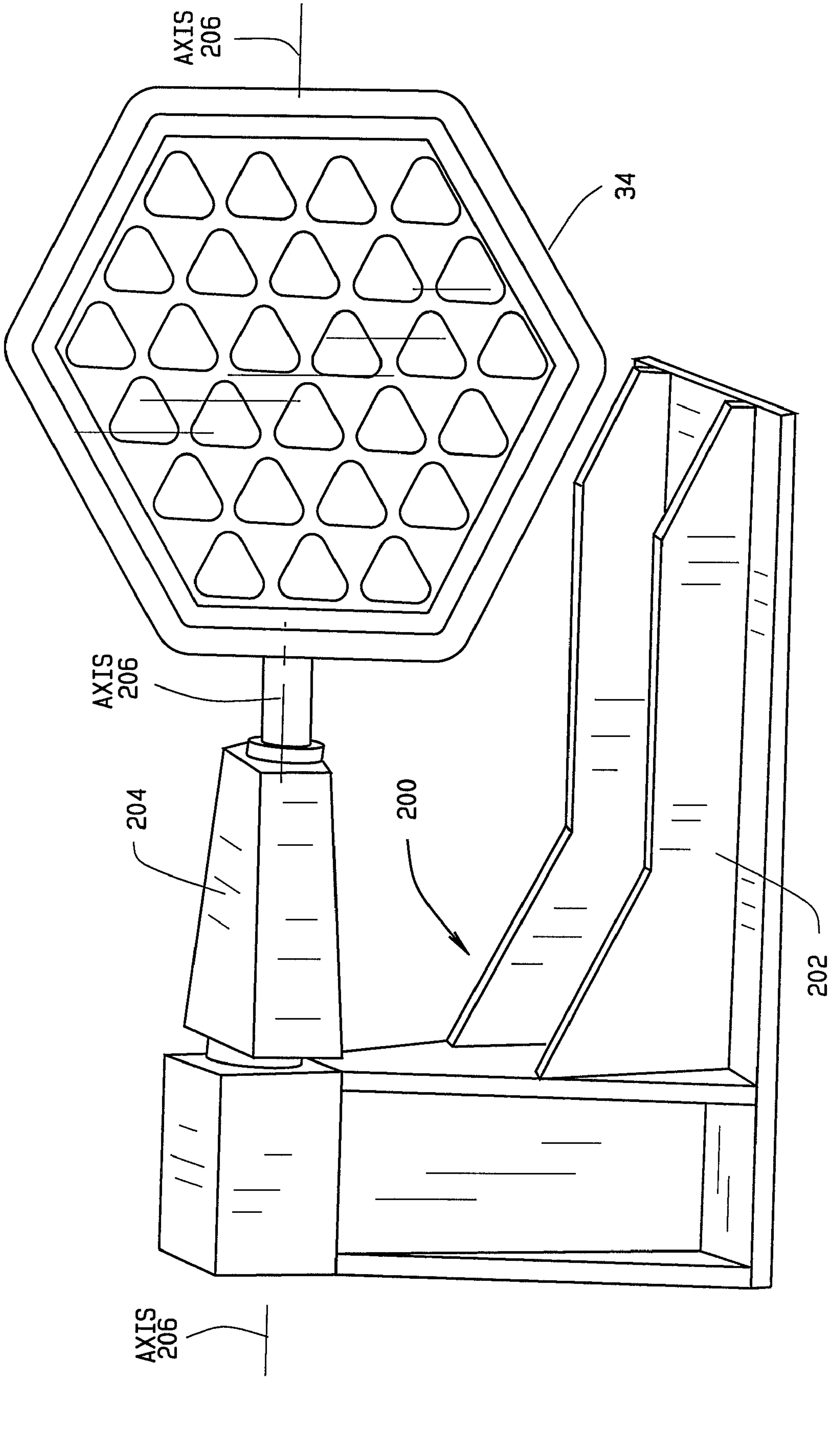
FIG. 4 is a perspective illustration of a optical target support fixture.

Following the establishment of the calibration-level reference plane P, an optical target 34 is disposed in at least one predetermined relationship to an upper surface of a single runway 102A, 102B of the vehicle lift system 100. To ensure that the optical target 34 is disposed in a predetermined relationship to the upper surface of the runway 102, an optical target mounting stand or support fixture 200 is preferably provided, as shown in FIG. 4. The optical target mounting stand or support fixture 200 consists of a support base 202, adapted to rest on an upper surface of the runway 102, and a target coupling 204 secured to the support base 202 in a predetermined relationship. The support base is preferably configured to seat on the plane of the upper surface of the runway 102, and may optionally consist of a planar base as shown in FIG. 4, a tripod arrangement (not shown), or any other alternate configuration (not shown) which is stable on a planar surface. Alternatively, the optical target mounting stand or support fixture 200 may be a fixture secured to the vehicle lift system 100 or runway 102.

The target coupling 204 is configured for receiving or holding the optical target 34 for rotational movement about an axis 206, which is preferably parallel to a plane defined by the support base 202, such that the optical target 34 is aligned at a known orientation relative to the surface of the runway 102 on which the support base 202 is disposed.

With the optical target mounting stand or support fixture 200 disposed on the surface of the runway 102, at least one image of the optical target 34 secured to the optical target mounting stand or support fixture 200 is acquired by the measurement sensors 14 of the vehicle wheel alignment system 10. From the acquired image, a determination of a position and orientation of the optical target 34 is made by the vehicle wheel alignment system 10. The orientation of the axis 206 is identifiable from the orientation of the optical target 34, and is related to the orientation of the surface of the runway 102 due to the construction of the optical target mounting stand or support fixture 200.

The determined position and orientation of the optical target 34, the established calibration-level reference plane P, and the predetermined relationship between the optical target mounting stand or support fixture 200 and the runway 102 are utilized to identify an initial orientation of the upper surface of the runway 102 relative to the established calibration-level reference plane P, at the location of the optical target mounting stand or support fixture 200. Those of ordinary skill in the art will recognize that the upper surface of the runway 102 may twist, and as such, may have different orientations relative to the calibration-level reference plane P at different locations along the length of the runway 102. Accordingly, it is preferably that at least two measurements of the runways surface orientation be determined by positioning the optical target mounting stand or support fixture 200 and associated optical target 34 at two or more locations on the upper surface of the runway 102. Suitable locations for placement of the optical target mounting stand or support fixture 200 include locations adjacent the positions on the runway 102 at which the wheels of a vehicle will rest during a vehicle service procedure. Identical procedures are then utilized to determine runway surface orientations for the opposite runway 1028.

Those of ordinary skill in the art will recognize that the present invention is not limited to the determination of runway orientation using optical targets 34, and that the mounting stand or support fixture 200 may be adapted for use with any of a variety of sensors capable of providing an inclination measurement to the vehicle wheel alignment system 10. For example, a micro-electromechanical gyroscope or gravity-referenced accelerometer such as found in a wheel-mounted alignment angle sensor unit may be utilized to provide signals representative of runway surface orientation to the vehicle wheel alignment system 10 in a conventional manner, either by wireless communications or via interconnected communication lines. Similarly, it will be recognized that the mounting stand or support fixture 200 may be eliminated when utilizing sensors other than the optical targets 34, provided that the sensors can be placed on the runways 102 in a predetermined relationship such that a runway surface orientation is determinable from a measured sensor inclination.

Using the determined runway surface orientations, those of ordinary skill in the art will recognize that the vehicle wheel alignment system 10 may be configured to compensate one or more vehicle wheel alignment angle measurements for the effect of the determined runway surface orientations. Alternatively, the determined runway surface orientations can be provided to an operator in a numerical or graphical display through the operator interface 16, together with a predetermined threshold value for runway misalignment tolerance, prompting the operator to adjust the runways 102A, 102B to correct the misalignment. Adjustments to the runways 102A, 102B are carried out in accordance to instructions provided by the manufacturer of the vehicle lift system 100, and may be by the placement of shims, adjustment of bolts, or other suitable means depending upon the individual structure of the vehicle lift system 100.

An alternate method of the present invention enables a vehicle wheel alignment system 10 to compensate one or more wheel alignment angle measurements for detected deviations in the surface orientation of at least one runway 102A, 102B of an automotive vehicle lift system 100 on which a vehicle undergoing a wheel alignment angle measurement procedure is supported.

An initial step of establishing a calibration-level reference plane P for the pair of runways 102A, 102B of the vehicle lift system 100 is preferably carried out in a conventional manner utilizing the machine-vision vehicle wheel alignment system 10 and a calibration fixture 14, as previously described. The calibration fixture 14 is disposed across the pair of runways 102A, 102B in a sequence of predetermined positions, and images of the optical targets 34, adjacent each side of the runways 102A, 102B are acquired. From the acquired images, the machine-vision vehicle wheel alignment system 10 is configured to determine the calibration-level reference plane P in three-dimensional space which is representative of a surface substantially define by the upper surfaces of the pair of runways 102A, 1028, as shown in FIG. 2.

Figure 5:
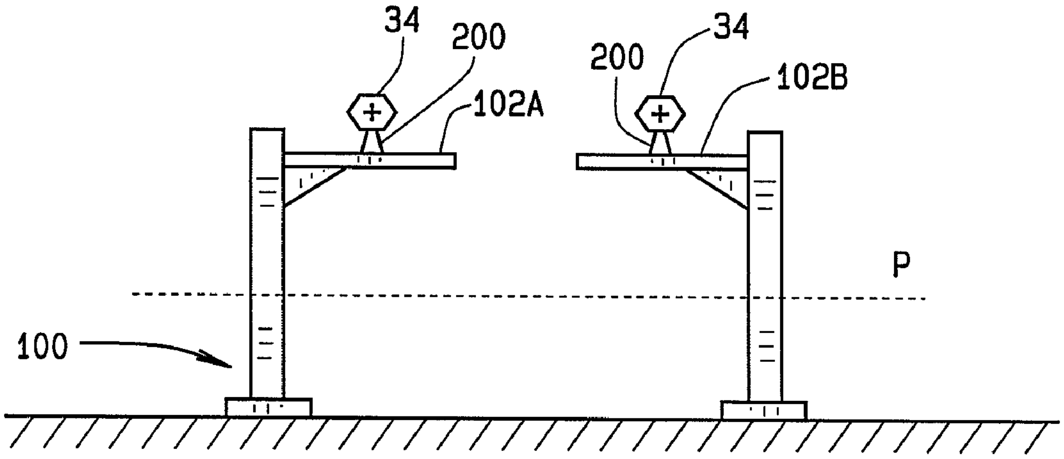
FIG. 5 is a simplified front view of a vehicle lift system having a pair of runways on which are disposed a pair of optical targets.

Following the determination of the calibration-level reference plane P, an optical target 34 is disposed in at least one predetermined relationship to an upper surface of a single runway 102A, 102B of the vehicle lift using the mounting stand or fixture 200, as shown in FIG. 5. The optical target 34 is observed by the vehicle wheel alignment system 10, and a first orientation of an upper surface of at least one of the runways 102A, 102B relative to the established calibration-level reference plane P is determined by the vehicle wheel alignment system 10 from the target observations, as previously described.

Figure 6:
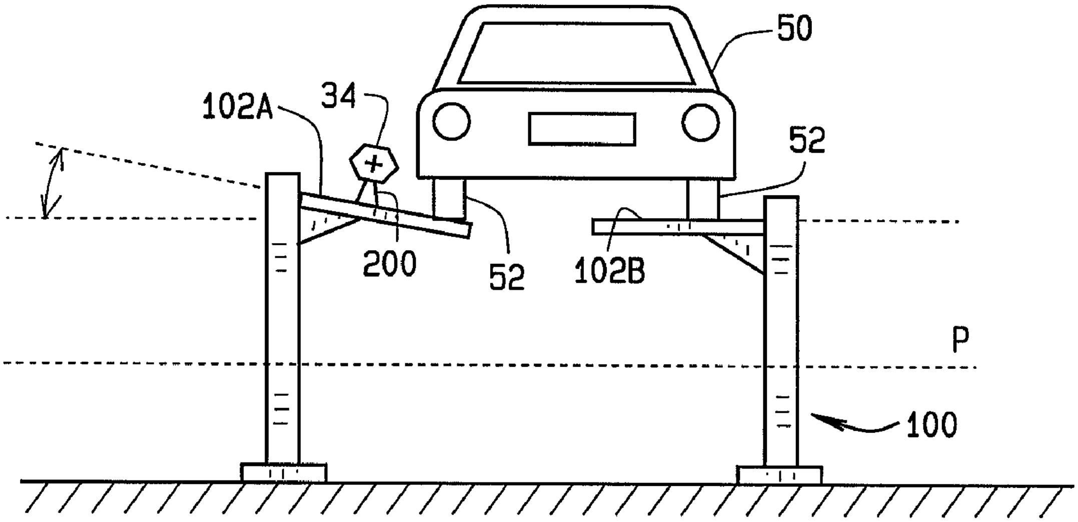
FIG. 6 is a view similar to FIG. 5, illustrating an effect of a vehicle disposed on the vehicle lift system runway.

Next, a vehicle 50 undergoing an alignment angle measurement procedure is positioned on the automotive vehicle lift system 100, with at least one wheel 52 of the vehicle on the runway upper surface. A second orientation of the upper surface of the individual runways 102A, 102B is determined by the vehicle wheel alignment system 10, using observations of the optical targets 34 disposed on the mounting stands or fixtures 200 in proximity to the vehicle wheels 52. The first and second orientations of the runways surfaces are utilized to identify a change θ in the orientation of an upper surface of a runways 102A, 20B relative to the established calibration-level reference plane P due to the effect of the vehicle disposed on the runways 102A, 102B. For example, as shown in FIG. 6, the position of the vehicle wheel 52 on runway 102A may resulted in a twisting of the individual runway 102A from an initially horizontal position parallel to the calibration-level reference plane P, due to the weight of the vehicle 50 exerted on the runway surface as displaced from the supporting substructure of the vehicle lift system 100. Subsequently, any alignment angle measurements associated with a wheel 52 of the vehicle 50 may be compensated for the effect of the identified change θ by the vehicle wheel alignment system 10.

Figure 7A:
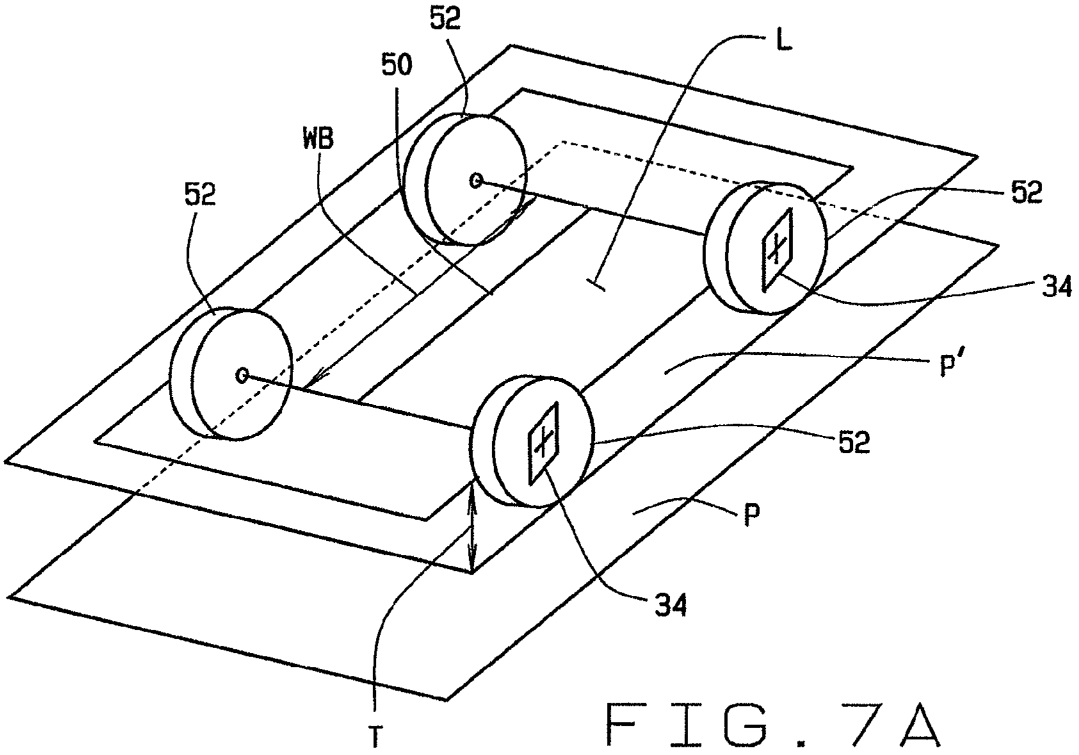
FIG. 7A is a simplified perspective view of the various reference planes and wheel planes associated with a vehicle disposed on a vehicle lift system.
Figure 7B:
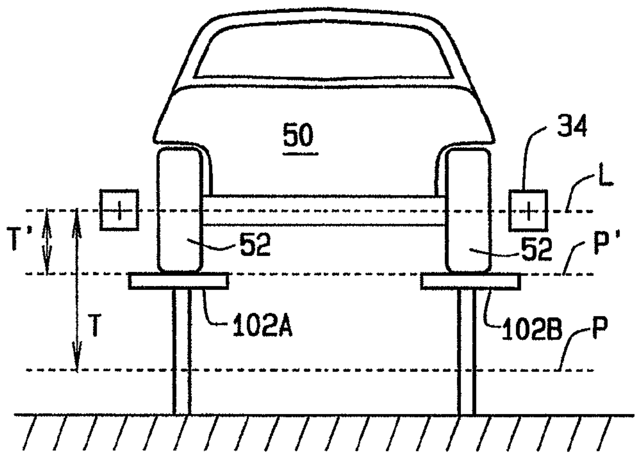
FIG. 7B is an end view of the various planes illustrated in FIG. 7A.

An established reference plane may be utilized in a variety of vehicle measurement procedures. In a second alternate method of the present invention, a set of optical targets 34 are removably disposed about the runways 102 of the automotive vehicle lift system 100, and a set of associated measurements of the position and orientation of each optical target 34 are acquired by the machine vision wheel alignment system 10. The measurements utilized to establish the reference plane may be initially acquired as part of a calibration procedure for the vehicle wheel alignment system 10, establishing the calibration-level reference plane P, or separately, after some movement of the vehicle lift system 100, establishing a second reference plan P', as required. Subsequently, during a vehicle wheel service procedure, a set of optical targets 34 are operatively coupled to the wheels 52 of a vehicle 50 disposed on the runways 102, and a set of measurements of the position and orientation of each wheel-mounted optical target 34 is acquired by the machine vision wheel alignment system 10, establishing a "live" plane L associated with the vehicle 50, as shown in FIGS. 7A and 7B.

Those of ordinary skill in the art will recognize that a single plane may not be identified which physically intersects the position of each optical target or vehicle wheel. Accordingly, while described in the context of flat planes, the present method may be implemented in alternate embodiments with the use of planes established by averaging the positions of two or more optical targets, vehicle wheels, or vehicle lift surfaces, or with the use of curved mathematical surfaces calculated to intersect the measured positions of the optical targets, wheels, or vehicle lift surfaces when determining calibration planes, reference planes, or "live" planes.

A comparison of the orientation of reference plane P or P' with the orientation of "live" plane L provides useful information related to the vehicle 50 or the vehicle lift system 100. For example, as shown in FIG. 7B, if the reference plane P (or P') and the "live" plane L are found to deviate from parallel alignment with each other by more than a predetermined tolerance T (or T') at a location corresponding to a vehicle wheel 52, the operator can be directed to check the specific vehicle wheel 52 to determine if the tire is under inflated or improperly sized compared to the tires on the other vehicle wheels 52. A properly inflated tire on a wheel 52 which is in good physical condition and under normal load will, to a large extent, maintain a toroidal shape with only a limited amount of elastic distortion adjacent the surface on which the tire is disposed. It is therefore possible to detect an under-inflation or other anomalous condition associated with an individual tire or wheel 52 if the shape of the tire 19 deviates significantly from the shape of the remaining tires on a vehicle 50.

Figure 8:
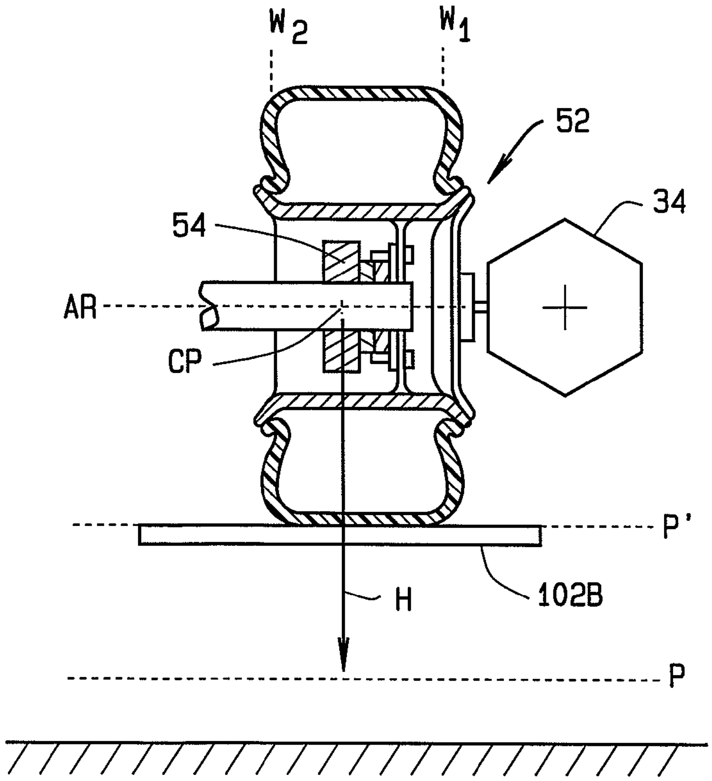
FIG. 8 is a sectional view of a single vehicle wheel disposed on a lift system runway, illustrating a measure of axle height.

One measurement which may be utilized to determine a tire condition is an axle height H associated with each wheel 52. The axle height measurement H is determined for each vehicle wheel 52 by calculating the height T (or T') of the "live" plane L above the reference plane P (or P') at a predetermined reference point associated with each vehicle wheel 52. For example, as shown in FIG. 8, the axle height H at a given wheel 52 may be defined as the distance between the wheel center point CP and the reference plane P (or P') regardless of the current position of the vehicle lift system 100. The wheel center point CP is defined as a point along an axis of a wheel bearing 54 for a vehicle wheel 52 that is halfway between a generally vertical plane W1 defined by the outboard rim of the vehicle wheel 52 and a generally vertical plane W2 defined by the inboard rim of the vehicle wheel 52. It is assumed that the axis of the wheel bearing 54 coincides with the axis of rotation AR of the vehicle wheel 52. Several important wheel alignment measurements can be computed based on the estimated locations of the wheel center points CP for an automobile undergoing wheel alignment.

For example, a measurement of the automobile's wheelbase WB may be estimated from the longitudinal distances between each of the front and rear wheel points CP on each side of the vehicle. The wheel points CP can also be used to estimate the location of the plane of the surface on which the automobile rests as it is measured. Such a plane can be used to compute common alignment angles such as camber.

If the vehicle lift system runways 102 are currently disposed in the initial calibration-level reference plane P, an actual axle height H measurement is be obtained by comparing the wheel points CP to the reference plane P. If the vehicle lift system runways 102 are displaced above or below the initial calibration-level reference plane P, the axle height H measurements obtained by comparing the current location of the wheel points CP to initial calibration-level reference plane P will not be representative of the actual vehicle axle heights, however, deviations in axle heights H between each vehicle wheel 52 will remain observable.

By comparing the height of each wheel center point CP to the calibration-level reference plane P, an average axle height $H_{avg}$ can be determined for the set of vehicle wheels 52, and an indication can be provided to an operator of any individual axle height H which varies from the determined average $H_{avg}$ by more than a predetermined tolerance. A determination of an axle height deviation may alternatively indicate that a problem exists with the vehicle lift system runways 102 on which the vehicle wheels 52 are disposed, for example, if the lift system runways 102 do not move uniformly from the initial calibration-level reference plane P when raised or lowered, and are not maintained in a level configuration at the current elevation or reference plane P'.

Figure 9:
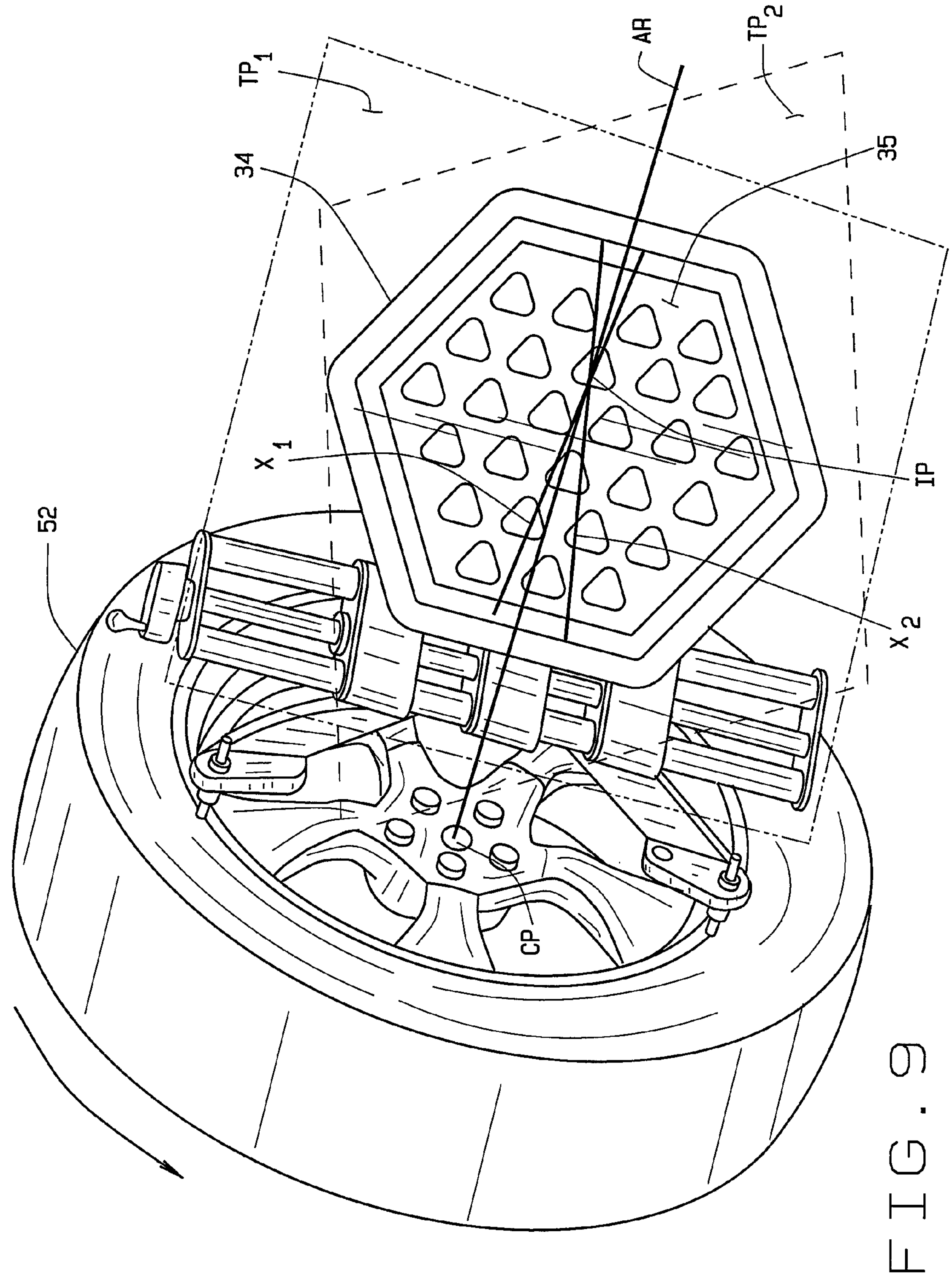
FIG. 9 is a perspective illustration of an optical target mounted to a vehicle wheel, rotated between two positions about an axis of rotation.

A reference point, such as the wheel center point CP may be established for a vehicle wheel 52 using an optical target 34 operatively coupled to the vehicle wheel 52 in a predetermined relationship, as shown in FIG. 9. Two or more images of the wheel-mounted optical target 34 are acquired at different rotational positions of the vehicle wheel, and a position and orientation of the wheel-mounted optical target 34 is determined in a three-dimensional coordinated system from the acquired images.

The three-dimensional direction vector corresponding to a wheel's axis of rotation AR can also be estimated from two or more optical target location "snapshots", taken as the wheel 52 is rotated about the axis of rotation AR. Mathematical techniques may be used to obtain a direction vector from the target location and attitude information contained in two or more snapshots. Although direction information can be obtained, specific points in space which are known to lie on the wheel's axis-of-rotation AR are not identified.

Using the predetermined relationship between the wheel-mounted optical target 34 with the vehicle wheel 52, and the predetermined configuration of the optical target 34, an intersection point IP is identified in the three-dimensional coordinate system between an axis of rotation AR of the vehicle wheel 52 and a face 35 of the optical target 34. This intersection point IP is referred to as the "nominal piercing point". Assuming that the actual configuration of the wheel 52 and the optical target 34 conforms with the predetermined configurations thereof, the predetermined configuration of the wheel-mounted optical target 34 and the intersection point IP are utilized to identify a point on the axis of rotation AR which is displaced from the target face 35 by a predetermined distance, based on the known configuration of the optical target 34 and vehicle wheel 52. The identified point corresponds to the wheel center point CP of the vehicle wheel 52.

Alternatively, a wheel center point CP for a vehicle wheel 52 may be determined from a sequence of images of an optical target 34 operatively coupled to the vehicle wheel 52. The vehicle wheel 52 is rotated about the axis of rotation AR while a sequence of at least two images of the wheel-mounted optical target 34 is acquired. The acquired sequence of images is utilized by the vehicle wheel alignment system 10 to identify an actual intersection point IP between the axis of rotation AR of the vehicle wheel 52 and the face 35 of the optical target 34 as a point on the target face 35 having the least amount of linear deviation in the sequence of images.

Those of ordinary skill in the art will recognize that several methods may be utilized to identify the actual intersection point IP on the target face 35, for example, a non-linear optimization technique such as the Levenberg-Marquardt algorithm may be employed to solve an over-determined system of simultaneous equations to identify the point on the target face 35 having the least amount of linear movement between two or more sequential images. However, non-linear optimization techniques are preferably utilized in situations where the vehicle 50 is permitted to roll in a linear direction and a series of images of the target face 35 are captured. It is assumed that the axis of rotation AR of the wheel 52 continues to point in the same direction in each of the images.

Alternatively, as shown in FIG. 9, planes TP1 and TP2 defined by the features on the flat target face 35 are identified by the vehicle wheel alignment system 10 in each image of the optical target 34 at two different rotational positions of the vehicle wheel 52, without requiring translational movement of the vehicle wheel 52, i.e. when the vehicle 50 is jacked up above a supporting surface and the wheel 52 is not resting on the surface during rotation. An equation representative of a line of intersection between each of the two planes TP1 and TP2 is determined in a coordinate system based on the first plane TP1, and next in a coordinate system based on the second plane TP2. There are therefore two separate planar lines X1 and X2 determined in the two separate planar coordinate systems and only one line AR determined by the intersection of the two planes TP1 and TP2 in a three dimensional coordinate system. The single point of intersection of the two lines X1 and X2 in a common coordinate system, preferably the coordinate system of the target face 35, represents the actual intersection point IP between the axis of rotation AR of the wheel 52 and the target face 35, as shown in FIG. 10

The actual intersection point IP, together with the predetermined configuration of the optical target 34 are utilized to identify a point on the axis of rotation AR displaced from the target face 35, corresponding to the wheel center point CP for the vehicle wheel 52. Employing the actual intersection (piercing) point IP instead of the nominal intersection point IP improves subsequent determinations of the wheel center point CP and subsequent vehicle wheel alignment calculations or measurements by the vehicle wheel alignment system 10.

Figure 10:
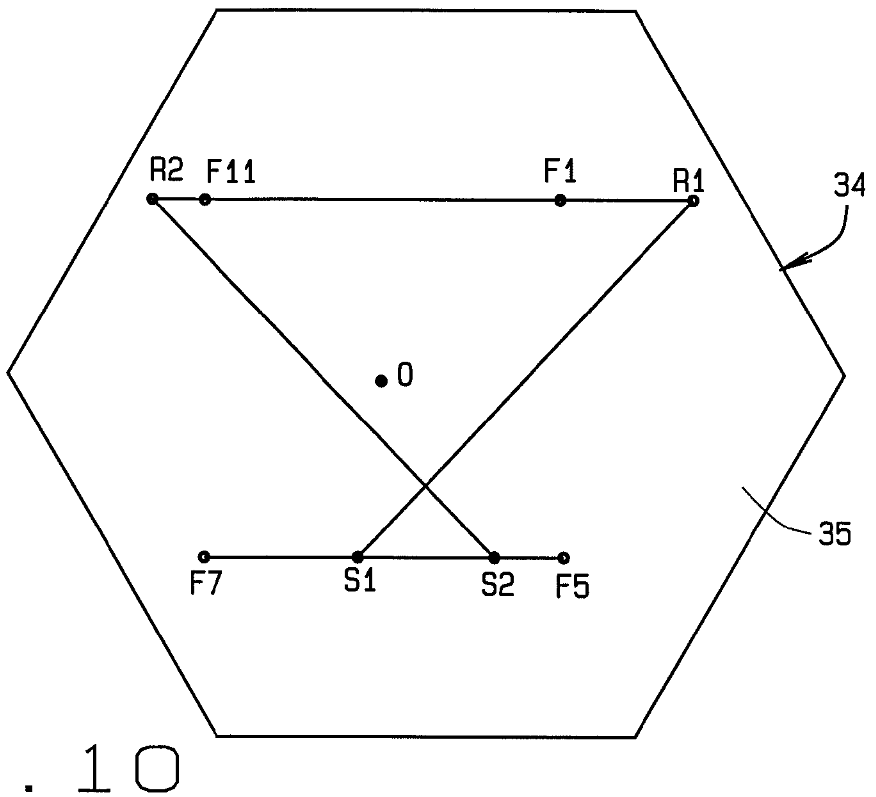
FIG. 10 is a simplified representation of reference points and associated interrelationships on an optical target face.

With reference to FIG. 10, the method for determining the actual intersection point IP using intersecting lines is described in more detail. A target face coordinate system is initially established based on visible features F of the optical target 34. Precise coordinates are predetermined for all the features F on the target face 35. The origin of target face coordinates is based on a feature (real or determined) at the center of the array of visible features F. Four feature points F1, F5, F7, and F11 around the periphery of the target face are used in the method. These four outer features F of the target face 35 are selected to each lie at the same radius from the target origin O. Although many sets of four features F could be employed, the preferred method uses features arrayed around the target face 35 in a manner analogous to particular hours on a clock face. Feature F1 corresponds to one o'clock, feature F5 corresponds to five o'clock, feature F7 corresponds to seven o'clock and feature F11 corresponds to eleven o'clock.

The optical target 34 is mounted to the wheel 52 such that the axis-of-rotation AR is not normal and not parallel to the target face 35. There are four coordinate systems involved in the method, an imaging system or camera coordinate system that identifies the position and attitude of objects relative to the imaging system or camera measurement sensors 14 of the vehicle wheel alignment system 10, a target face coordinate system that identifies the location of target features relative to the center of the pattern on the optical target face 35, and are two snapshot coordinate systems, Snap1 and Snap2.

The Snap1 coordinate system is such, that any point in space is assigned coordinates that match the target face coordinates the point would have when the target face 35 is aligned with the first image snapshot position. Analogously, the Snap2 coordinate system matches target face coordinates when the target face 35 is aligned with the second image snapshot position.

The machine-vision vehicle wheel alignment system 10 computes the instantaneous coordinate transform between target coordinates and camera coordinates. Therefore, the two image snapshots facilitate computation of coordinate transforms between all four of the above-mentioned coordinate systems.

Initially, the Snap1 coordinates of features F11 and F1 are obtained. These will be the same as the target coordinates of those features, according to the precise design model of the optical target 34. The coordinates of these features are transformed into Snap2 coordinates. Both points will probably be outside the Snap2 target face plane (which would have a z coordinate of zero). A line is defined between the two points and the point R where that line intersects the Snap2 target face plane is identified. Point R lies in both snapshot planes. The set of coordinates that describe point R in Snap1 coordinates is designated R1, and the set of coordinates that describe point R in Snap2 coordinates is designated R2. Because R2 lies in the second snapshot target face plane, the z-coordinate of R2 is zero.

The known transform between the coordinate systems is applied to find the coordinates of point R in Snap1 coordinates, i.e. R1. Because R1 lies in the first snapshot target face plane, the z-coordinate of R1 is zero.

Next, the Snap1 coordinates of where features F7 and F5 appeared during the first snapshot are obtained. These will be the same as the target coordinates of those features, according to the precise design model of the optical target 34. The two points are transformed into Snap2 coordinates. Both points will probably be outside the Snap2 target face plane (which would have a z coordinate of zero). A line is formed between the two points and the point where that line intersects the Snap2 target face plane is identified. The intersection in space will be called point S, and lies in both snapshot planes. Together, points R and S define the line in space where the two snapshot planes intersect. The set of coordinates that describe point S in Snap2 coordinates will be called S2. Because S2 lies in the second snapshot target face plane, the z-coordinate of S2 is zero.

The known transform between coordinate systems is again applied to find the coordinates of point S in Snap1 coordinates. These coordinates will be referred to as S1. Because S1 lies in the first snapshot target face plane, the z-coordinate of S1 is zero.

Next, R1, R2, S1 and S2 are identified on the same two-dimensional grid of target coordinates. All four have a z-coordinate of zero, so they may be treated as X-Y coordinate pairs. The equation of the line joining the coordinate pairs R1 and S1 is identified. This line represents the set of Snap1 coordinates for all points that lie on both snapshot planes. Next, the equation of the line that joins the coordinate pairs R2 and S2 is identified, representing the set of Snap2 coordinates for all points that lie on both snapshot planes. Solving these two line equations simultaneously yields the X and Y target face coordinates of the actual piercing point PP.

Having an accurate estimate of the piercing points PP for each optical target 34, and therefore the wheel center points CP for each vehicle wheel 52, can be used to identify possible tire problems. If an automobile has near-zero camber at all vehicle wheels 52, one would expect all wheel center points CP to lie the same distance above the rolling plane on which the vehicle wheels 52 rest. Variations within this set of distances could be evidence of tires being improperly inflated or of tires of unequal diameter being installed. If the location of the rolling surface relative to the vehicle wheel alignment system measurement sensors is precisely known, having accurate wheel center points CP allows the individual tire diameters to be estimated.

When a rolling procedure is used to provide the multiple images required to identify axes of rotation AR for the wheels 52, there is an opportunity to estimate the effective circumference of the tires. This is done by observing the angle through which the optical target 34 rotates from one snapshot to the next and observing the translation distance traversed by the optical target piercing point PP. Two $\pi$ multiplied by the translation distance, and then divided by the rotation angle in radians, yields the effective circumference of the tire on the wheel 52.

If the both the tire diameter and the effective circumference are computed, the roundness of the tire on the wheel 52 can be verified. If the ratio of effective circumference to diameter is much less than $\pi$, the tire on the wheel 52 may be under-inflated.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for comparing reference planes during a vehicle wheel alignment procedure using a machine vision vehicle wheel alignment system configured to acquire position and orientation data associated with at least one optical target disposed in a field of view of the machine vision vehicle wheel alignment system, comprising:

establishing a first reference plane associated with a surface on which a vehicle undergoing an alignment procedure is disposed;

acquiring positional information associated with each wheel of said vehicle;

establishing a second reference plane associated with each wheel of said vehicle utilizing said acquired positional information; and determining a difference between an orientation of said first reference plane and an orientation of said second reference plane.

2. The method of claim 1 further including the step of providing an indication of said determined difference responsive to said determined difference exceeding a predetermined threshold.

3. The method of claim 1 wherein the step of acquiring positional information further includes determining a wheel center point for each wheel of said vehicle; and wherein said second reference plane is associated with each of said determined wheel center points.

4. The method of claim 3 further including the step of calculating an axle height for each wheel of said vehicle as a vertical distance between each associated wheel point and said first reference plane.

5. The method of claim 4 further including the step of calculating an average axle height utilizing each calculated axle height; and identifying a vehicle wheel having an axle height varying from said calculated average axle height by more than a predetermined threshold.

6. The method of claim 4 further including the steps of identifying a lowest axle height associated with the wheels of said vehicle;

calculating a relative height difference between an axle height associated with each remaining wheel of said vehicle and said identified lowest axle height; and identifying each vehicle wheel having a calculated relative height difference exceeding a predetermined threshold.

7. The method of claim 4 further including the steps of identifying a tallest axle height associated with the wheels of said vehicle;

calculating a relative height difference between an axle height associated with each remaining wheel of said vehicle and said identified tallest axle height; and identifying each vehicle wheel having a calculated relative height difference exceeding a predetermined threshold.

8. The method of claim 1 wherein the step of acquiring positional information associated with each wheel of said vehicle further includes operatively coupling an optical target to each vehicle wheel in a predetermined relationship, each of said optical targets having a predetermined configuration;

acquiring two or more images of each of said optical targets, each of said images acquired at a different rotational position of the associated wheel;

determining from said acquired images, at least an orientation of each of said optical targets;

identifying an axis of rotation for each of said vehicle wheels from said determined orientations of said each of said associated optical targets;

utilizing said predetermined relationships between said optical targets and said vehicle wheels, and said predetermined configurations of said optical targets to identify for each vehicle wheel, an intersection point between said axis of rotation of said vehicle wheel and a face of said associated optical target;

utilizing said predetermined configurations of said optical targets and said identified intersection points to identify a point on each of said axis of rotation, displaced from said associated optical target faces by a predetermined distance, said points on said axis of rotation each corresponding to a wheel point for said associated vehicle wheels; and wherein said second reference plane is associated with each of said determined wheel points.

9. The method of claim 1 further including the step of determining a measure of deviation from parallel between said first reference plane and said second reference plane.

10. The method of claim 9 wherein said measure of deviation exceeding a tolerance is identified to an operator.

11. The method of claim 9 wherein said measure of deviation is representative, at least partially, of variations in tire inflation for each of said vehicle wheels.

12. The method of claim 9 wherein said measure of deviation is representative, at least partially, of variations in tire size for each of said vehicle wheels.

13. The method of claim 1 further including the step of determining a measure of vertical height between said first reference plane and said second reference plane at a selected point associated with each wheel of the vehicle, each of said measures of vertical height related to an axle height for said vehicle at said associated vehicle wheel.

14. The method of claim 13 wherein said selected point for each wheel of the vehicle is a wheel center point.

15. The method of claim 13 further including the step of identifying any of said measures of vertical height which deviate by more than a tolerance from an average of each of said measures of vertical height.

16. A machine vision vehicle wheel alignment system configured to acquire position and orientation data associated with optical targets disposed in a field of view, comprising:

a processor configured to receive data representative of images of said optical targets associated with a surface on which a vehicle undergoing an alignment procedure is disposed and associated with each wheel of said vehicle;

wherein said processor is configured to establish, from said received data, a first reference plane associated with said surface on which said vehicle undergoing an alignment procedure is disposed;

wherein said processor is configured to establish, from said received data, a second reference plane associated with each wheel of said vehicle; and wherein said processor is configured to determine a difference between an orientation of said first reference plane and an orientation of said second reference plane.

17. The machine vision vehicle wheel alignment system of claim 16 wherein said processor is further configured to determining, from said received data, a measure of vertical height between said first reference plane and said second reference plane at a set of selected points, and wherein said processor is configured to identify any point in said set of selected points at which said measure of vertical height deviates by more than a tolerance from an average vertical height between said first and second reference planes.

18. The machine vision vehicle wheel alignment system of claim 17 wherein said selected points are associated with each wheel of the vehicle, and wherein each of said measures of vertical height are related to an axle height for said vehicle at said associated vehicle wheel.

* * * * *